UNITED STATES PATENT OFFICE.

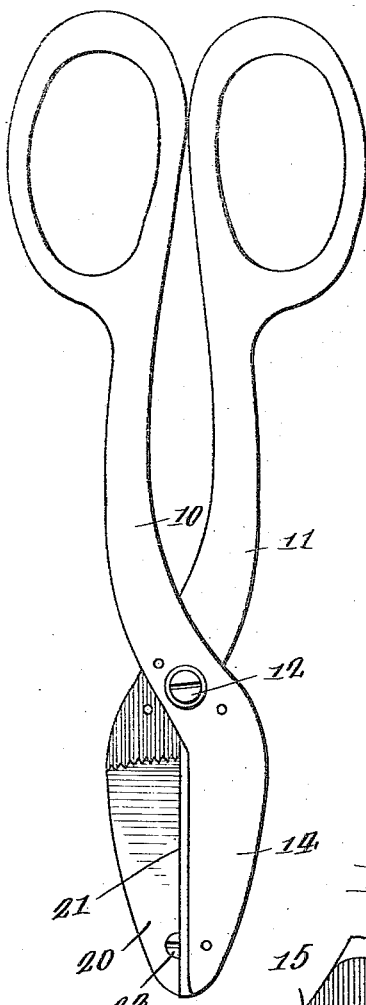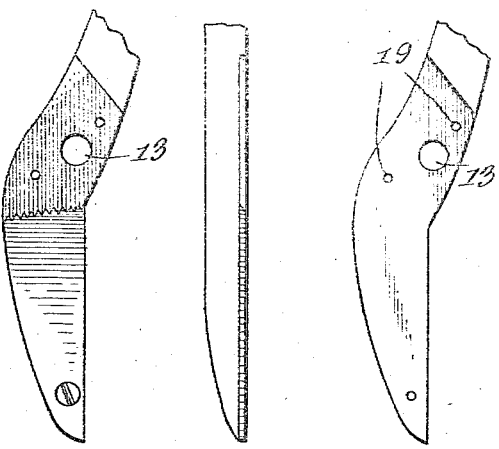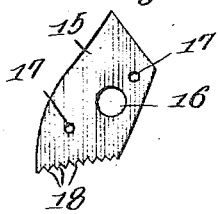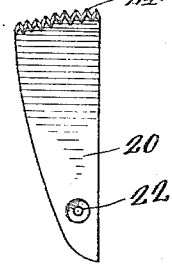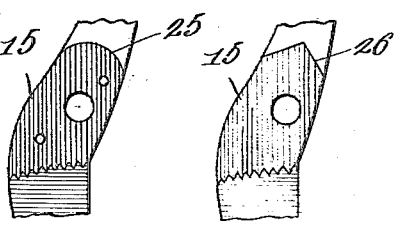

JOHN B. SCHNEIDER, OF CAPE GIRARDEAU, MISSOURI.

SHEARS.

1,269,319.　　　　　　　　Specification of Letters Patent.　　Patented June 11, 1918.

Application filed November 12, 1915. Serial No. 61,095.

*To all whom it may concern:*

Be it known that I, JOHN B. SCHNEIDER, a citizen of the United States, residing at Cape Girardeau, in the county of Cape Girardeau and State of Missouri, have invented certain new and useful Improvements in Shears, of which the following is a specification.

The present invention relates to certain new and useful improvements in shears, and more particularly to certain improvements in detachable wear plates or blades for shears and scissors of that type set forth in Patent Number 566,830 issued jointly to D. Widget and myself under date of Sept. 1, 1896.

The main object of the invention is to improve and cheapen devices of this character and therefore, to so construct the body of each of the shear members that provision is made for economically forming suitable teeth or serrations to mesh with similar teeth formed upon the wear plates.

While the teeth upon the wear plates may be formed by suitable machinery, it has been found that it is impossible to form teeth of uniform shape and dimension on the body of the shear members to accurately mesh with the teeth of the wear plate. Consequently, to overcome this difficulty and to provide a device that is more efficient in operation and which may be manufactured at a considerably less cost, I provide each of the shear members 10 and 11 with primarily detached plates which, of course, may be provided with teeth or serrations of a similar nature to the teeth or the apertures formed on the wear plates, formed by machinery, after which they may be electrically welded or otherwise secured to the shear members.

Various other objects and advantages will become apparent during the continuance of the following description.

The above and other objects which will become apparent, are accomplished by such means as are shown in their preferred form in the accompanying drawings, described in the following specification and then more specifically pointed out in the appended claims.

In the accompanying drawings wherein like characters designate like parts throughout the several views;

Figure 1 is a view in side elevation showing my invention as in its preferred embodiment.

Fig. 2 is a fragmentary view of one of the shear members, illustrating my invention more clearly.

Fig. 3 is an edge view of the shear members shown in Fig. 2.

Fig. 4 is a fragmentary view of a shear member showing the wear plate and the normally detachable plate removed therefrom.

Fig. 5 is a detail view of the primarily detached plate.

Fig. 6 is a detail view of one of the wear plates.

Fig. 7 is a fragmentary view of one of the shear members showing the normally detachable plate in a slightly modified form.

Fig. 8 is a similar view also showing the normally detachable plate in a similar modified form.

In the drawings the shear members 10 and 11 are pivotally connected as at 12 and are of substantially the conventional form. In reducing my invention to practice each of the said shear members are cut away from a point slightly above the openings 13 along the inner face of the jaws 14. The primarily detached plate 15 is provided with an opening 16 similar to the openings 13, and may also be provided with smaller openings 17 for the purpose that will presently appear. While these plates are detached teeth of uniform dimensions, such as shown at 18, are formed in one face thereof to correspond with suitable teeth or apertures formed in the wear plates, presently described. After the teeth 18 have been formed in the plates 15, the said plates may be fixed upon the shear members 10 and 11 so that the openings 13 and 16 are in substantial alinement. These plates may be fixed to the shear members by any suitable means such as by electrically welding the same in place or by passing rivets or other fastening members through the openings 17 and 19 respectively.

The wear plates 20 are normally of greater width than the jaws 14 so that their cutting edges 21 normally project beyond the inner edges of the said jaws. Each of the wear plates is provided with an aperture 22 adjacent its smaller end which receives a screw 23 whereby one of its ends may be held securely in position upon the respective jaw 14. The teeth 24 of the wear plates are inclined laterally of the major sides and fit snugly within the undercut notches between the teeth 18 of the plates 15 and are thus held against any accidental lateral movement. However by removing the fastening member 23 the wear plates may be adjusted so as to cause the further projection of the cutting edges 21.

By providing the primarily detached plates 15, the teeth 18 may be formed of the exact shape and dimensions as the teeth 24 on the wear plates, consequently assuring a tight and snug connection between the plates at that point. By forming the teeth 18 and 24 of the same dimensions, they mesh interchangeably and insure a close fit of the meshing teeth in every adjusted position.

The formation of the plates 13 may be varied to a substantial degree in accordance with the scope of my invention. For instance in Fig. 7 the rear end of the plate 15 is shown rounded as at 25 so as to fit into a similarly formed portion of the base of the cut-out. On the other hand, in Fig. 8 the rear end of the plate 15 is substantially wedge-shaped as shown at 26 and fits into a similar orifice or cavity in the rear wall of the cut-out. Either form of plate shown in the drawings may be used but it is desirable to vary the form of plate when fastening the same to the shear members in different manners. For instance when the plate is electrically welded to the shear members the form shown in Fig. 8 is preferable, whereas, if it is to be secured by rivets or other fastening means the form shown in Figs. 5 and 7 would of course prove advantageous.

From the foregoing it is believed that the novel features and advantages of my invention will be readily understood, therefore further detailed description is deemed unnecessary.

In reducing my invention to practice I find that the form referred to herein as the most practical and preferred embodiment is the most efficient, but realizing that certain conditions will necessarily vary in concurrence with the adoption of my device, I desire to emphasize the fact that various minor changes in the details of construction and in the proportion of parts may be resorted to when required without sacrificing any of the advantages of my invention defined in the appended claims.

Having thus fully described my invention, what I claim as new and desire to secure by Letters Patent is:

1. A shears element comprising a jaw having a pivotal portion, a plate separate from but connected with said jaw and formed with serrations in such relation that said serrations are located between said pivotal portion and the free end of the jaw and extend toward said free end, a plate having serrations formed therein to snugly mesh interchangeably with the serrations of said plate, and a securing element between said serrations and said free end, said securing element and said serrations permitting adjustment of the blade and holding said blade in different adjusted positions with relation to the said jaw.

2. The method of forming a shears element, which consists in (first) providing a jaw with a pivotal portion and a seat adjacent to the pivotal portion, (second) providing a plate with a series of counterpart serrations, (third) fixedly securing said plate to said seat so that its serrations extend toward the free end of said jaw, (fourth) providing a cutting blade with a series of counterpart serrations which are adapted to mesh interchangeably with the serrations of said plate, (fifth) and adjustably securing said cutting blade to a portion of the jaw near its free end and in such position that the serrations of said cutting blade may be caused to mesh interchangeably with the serrations of said plate.

In testimony whereof I affix my signature in presence of two witnesses.

JOHN B. SCHNEIDER.

Witnesses:
 HARRY NAETER,
 JOHN J. SCHNEIDER.